Nov. 24, 1931.  C. W. CROOKE, JR  1,833,416
AIRCRAFT
Filed Aug. 25, 1930   2 Sheets-Sheet 1
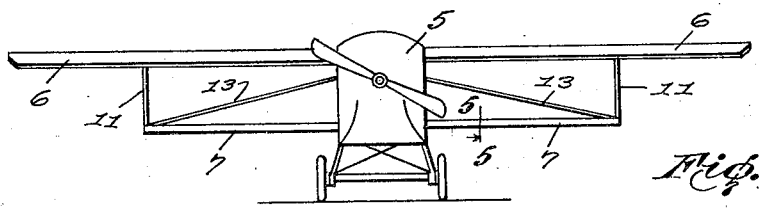
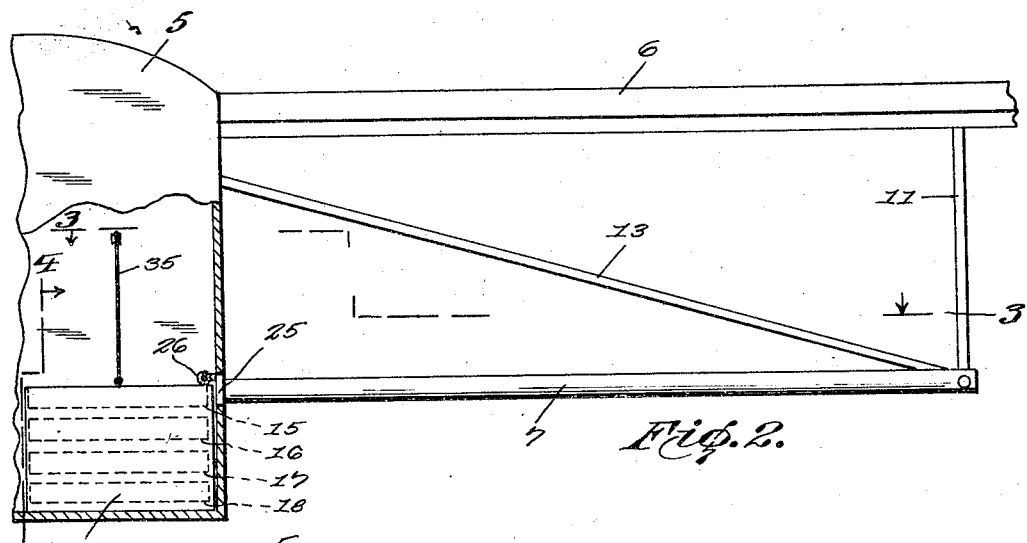
Inventor:
Charles W. Crooke, Jr.
By Hartwell Balcom
Attorney Nov. 24, 1931.  C. W. CROOKE, JR  1,833,416
AIRCRAFT
Filed Aug. 25, 1930  2 Sheets-Sheet 2

Inventor:
Charles W. Crooke, Jr.
By Hartwell Balcom
Attorney

Patented Nov. 24, 1931

1,833,416

UNITED STATES PATENT OFFICE

CHARLES W. CROOKE, JR., OF JACKSONVILLE, FLORIDA

AIRCRAFT

Application filed August 25, 1930. Serial No. 477,769.

The subject-matter of the present invention relates generally to aircraft, and the improvements are directed to a novel form of collapsible wing structure adapted to be extended from, or retracted into, the fuselage or cabin portion of an airplane.

As will presently appear, the primary object of the invention resides in the provision of a wing structure of the above-mentioned character, which may be extended from the fuselage of the plane to provide additional wing surface when taking off or landing, said additional wing surface permitting of slow landing and take-off speeds and the support of greater loads, said wing being susceptible of retraction within the fuselage or cabin portion of the machine while in flight, thus reducing wind resistance and permitting greater speeds.

Another object of the invention is to provide means in the form of guide rods for supporting the wing in extended position from the fuselage of the plane, said rods being adapted to form respectively the leading and trailing edges of the wing.

Another object is to provide means for supporting said guide rods.

Still another object of the invention resides in the provision of a novel form of wing structure, embodying a plurality of detachable sections adapted to be connected and reciprocated between and along said guide rods.

Still another object is to provide means for coupling said sections of said wing.

A still further object of the invention is to provide novel means whereby said wing sections may be arranged in superimposed spaced relation within said airplane, said means being susceptible of operation to elevate and connect the wing sections together prior to their extension along said guide rods.

Another important object is to provide means whereby the individual sections may be extended from and retracted into said airplane.

With these objects in view, together with others which will appear as the description proceeds, the invention resides in the novel formation, combination, and arrangement of parts, all as will be described more fully hereinafter, illustrated in the drawings, and particularly pointed out in the claims.

In said drawings:

Figure 1 is a front elevation of a typical form of aircraft, of the monoplane type, equipped with my invention.

Fig. 2 is a fragmentary front elevation of the same, with parts broken away to show the wing sections housed within the airplane.

Fig. 3 is a horizontal sectional view, taken on the line 3—3 of Fig. 2, showing the guide rods in plan.

Fig. 7 is a sectional view of a slightly modified form of guide rod and wing section, said guide rod forming the leading edge of a wing.

Fig. 8 is a similar modification, the guide rod in this instance forming the trailing edge of the wing.

Figure 4:
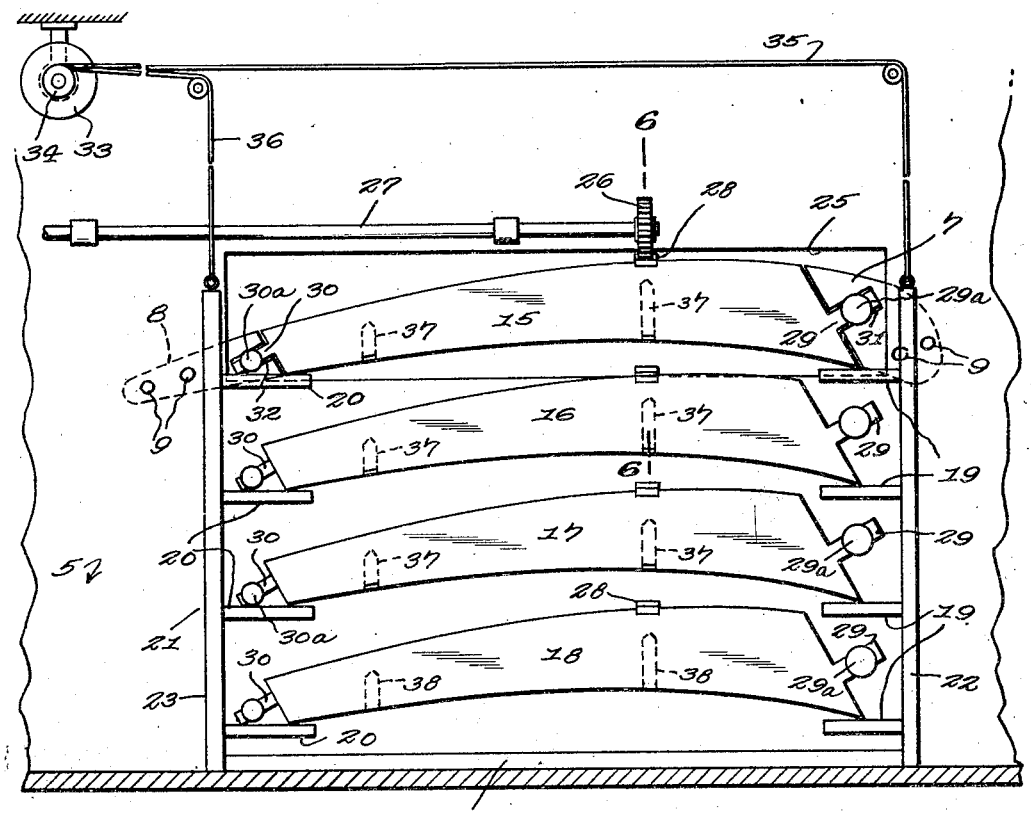
Fig. 4 is a sectional view, somewhat enlarged, and taken on the line 4—4 of Fig. 2 to show the wing sections housed in superimposed spaced relation within the airplane.

Referring now more in detail to the accompanying drawings, wherein like characters of reference denote similar parts throughout the several views, let 5 indicate generally the cabin portion of an airplane, of the monoplane type, and having the usual wing portion 6 extending laterally therefrom, said wing and cabin portion being adapted to support the various parts of my invention, as will presently appear.

As pointed out hereinbefore, I propose to provide additional wing surface for an airplane, and in the present instance, the use of my invention converts the well-known monoplane type of machine into a biplane, thus producing a plane capable of slow landing and which may take-off from the ground within a remarkably short interval of time.

To this end, I provide a pair of guide rods 7 and 8, which are arranged in spaced parallelism below said wing 6 and extending from both sides of the cabin portion 5, the inner ends of said rods being suitably affixed to the side of the cabin, as indicated at 9, (see Fig. 4), while their outer ends are connected by a cross-bar 10, each being joined to the wing 6 by means of the vertical rods 11 and 12. If desired, further support may be provided by the addition of the diagonal braces 13 and 14 extending from the said cabin 5, as clearly shown in Figs. 2 and 3. From the foregoing it is obvious that said rods 7 and 8 are adequately maintained in a fixed position to withstand wind pressure or other forces tending to displace said rods. While said rods and their supporting means may become a permanent fixture to said monoplane when in flight, it will, of course, be understood that means may be provided to fold the same alongside the cabin of said plane.

As previously explained, it is proposed to provide a wing which may be retracted into the cabin or fuselage of a plane when the latter is in flight, thus materially reducing wind resistance and at the same time permitting of greater speed of the plane. My novel form of wing structure comprises of plurality of sections, which in the present instance are designated by the numerals 15, 16, 17 and 18, each being similar in construction and assuming the configuration shown in Fig. 4. Normally said sections are housed within the cabin of the plane, wherein they are maintained in superimposed spaced relation by means of rails 19 and 20, disposed in spaced relation at both sides of the elevator 21. Said elevator comprises side walls 22 and 23 and a bottom portion 24, said rails 20 and 19 extending inwardly of said walls 22 and 23, as shown. It will be seen that the arrangement is such, that normally said section 15 is positioned opposite the opening 25 and in alignment with said rods 7 and 8, whereas the other sections are disposed directly beneath said section, each section being detached from its companion. Said section 15 being in the position aforesaid, it is only necessary to provide means to slide the same through the opening 25 between said rods 7 and 8, and it will be observed that I have provided a spur gear 26, affixed to a rotatable shaft 27, carried by said cabin, said gear 26 enmeshing with a rack 28 positioned on the top surface of said section 15. As shown in the drawings, each section will be provided with a rack 28, and the rotation of shaft may be effected by manual means in the form of a crank, or the like, or the same may be motor-driven, as desired. Said sections may be slid in and out by the method shown, by the use of a chain cable, pneumatic pump or other suitable means.

Figure 5:
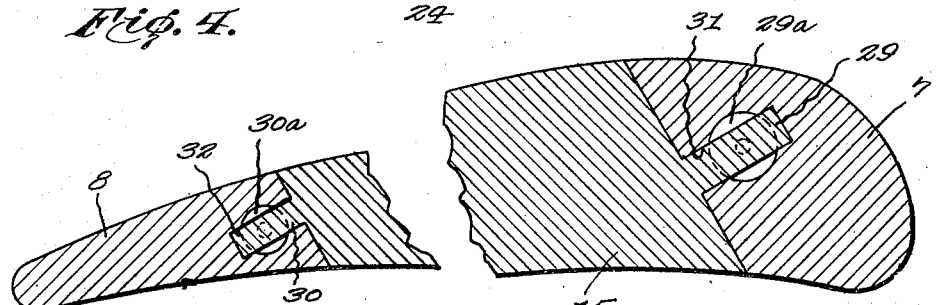
Fig. 5 is an enlarged transverse section of the wing and the guide rods, said section being taken substantially on the line 5—5 of Fig. 1.
Figure 6:
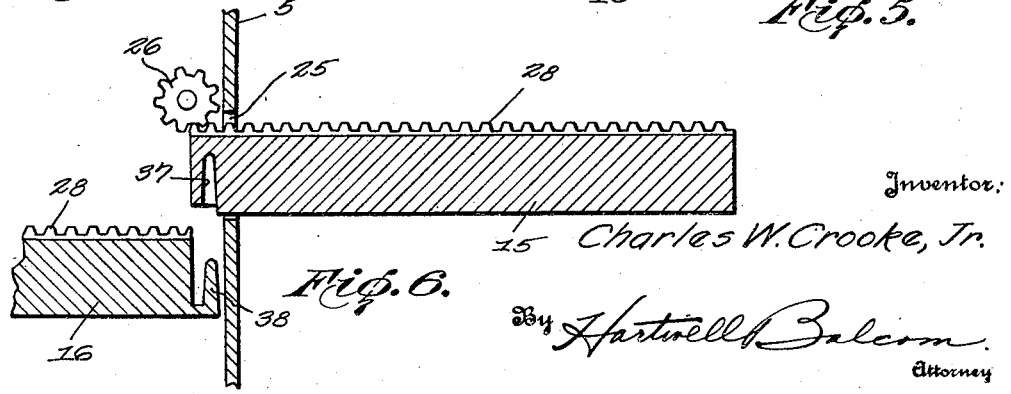
Fig. 6 is a vertical sectional view, taken substantially on the plane of the line 6—6 of Fig. 4 to diagrammatically show a wing section extended with its companion about to rise to couple therewith.

From the foregoing it is apparent that the rotary movement of said gear 26, enmeshed with rack 28, of section 15, causes the latter to slide out through said opening 25 and between the rods 7 and 8. As shown in Fig. 4, the front and rear faces of each of the sections are provided with extensions 29 and 30 which enter slots 31 and 32 in rods 7 and 8 respectively as the section 15 is advanced as aforesaid, and as the rotation of said gear 26 continues, said section 15 is extended between said rods 7 and 8 and substantially in the position indicated in Fig. 6. Having extended one section it becomes necessary to raise the other sections so that said gear 26 may operate as before. To this end, said elevator 21 is raised by operating a hand wheel 33, suitably arranged within the cabin, said wheel having journalled therewith a drum 34 onto which are wound the flexible elements 35 and 36 having their other extremities connected to the upper edge of the side walls 22 and 23 of said elevator 21. In view of this arrangement it is only necessary to operate said hand wheel 33 until the section 16 is raised sufficiently to enmesh the rack 28, of said section 16, and the gear 26, whereupon said gear 26 is operated as before to slide said section 16 between the rails 7 and 8 and this movement also advances section 15 along said rails. This procedure is continued until all the sections are slidably positioned between the rails, and thus the complete wing is formed. While said sections do not substantially comprise the entire wing, it will be observed in Figs. 4 and 5 that said rails 7 and 8 are formed to present the leading and trailing edges of the wing and hence said sections and rods 7 and 8 unitedly complete the formation of a suitably proportioned wing. Each of the extensions 29 and 30 may be provided with a plurality of roller bearings 29a and 30a and the entrances to the slots or grooves 31 and 32 may be beveled, thus facilitating the cooperating between said slots and extensions. Obviously, said drum 34 may be motor-driven, if desired.

With the auxiliary wings spread as shown in Fig. 1, the monoplane now becomes a biplane with all the attendant advantages, as aforesaid. When it is desired to retract the wings, as in flight, or other times, the spur gear 26, which was left enmeshed with the rear portion of the rack 28 of said section 18, is rotated to retract said section into the cabin. Obviously, it is necessary to provide means whereby the sections are coupled together during their passage between the rods 7 and 8, or else only said section 18 can be retracted. In this regard, attention is directed to Fig. 6 wherein it will be noted that the rear lower surface of said section 15 is provided with apertures 37, while the forward portions of each of the sections 16, 17, and 18 is provided with pins 38. Thus, as section 15 is projected through the opening 25, as aforesaid, the apertures 37 therein are in position to be engaged by pins 38 when said section 16 is raised as aforesaid. Thus, the sections are coupled together, and since each of sections 16 and 17 has apertures, similar to 37, in its rear lower surface, the aforesaid coupling of the sections is effected as the respective sections are advanced for projection through the opening 25. Since the sections, when extended between the rods 7 and 8, are coupled together, the entire wing structure may be retracted into the cabin by operating the gear 26 as aforesaid and thus as the section 18 slides onto the rails 19 and 20, the elevator is lowered to permit the next section 17 to slide on the rails above the section 18 and this operation is continued until all the sections are housed within the cabin.

Obviously, the number of wing sections will depend upon the length of the wing structure and while Fig. 1 shows the auxiliary wings as extending from the cabin a distance less than the length of the wing 6, it will be understood that said auxiliary wings may be dimensioned to closely approximate said wing 6 in spread.

It will, of course, be understood that the structure just described is duplicated for the other side of the plane and that the wing sections may be half the width of the cabin so that the two sets of sections are in juxtaposition. Under some situations they may be of a width of the cabin by alternating the sections to go on opposite sides of the cabin one above the other.

While the roller bearings 29a and 30a facilitate the passage of the sections along the rods 7 and 8, it will be noted that said rollers are suitably angled to take care of the upward and backward wind pressure on the sections. Likewise, the contiguous faces of the sections and the rods 7 and 8 are angled as shown.

In the forms shown in Figs. 7 and 8, the extensions 38a and 39 are each provided with pulleys or rollers 40 and 41, pintles 42 and 43 being provided, said pintle 42 carrying rollers 44 and 45, while pintle 43 carries rollers 46 and 47. In this instance, rollers 44, 45, 46 and 47 take care of backward wind pressure on the wing sections, while rollers 40 and 41 take care of the upward pressure on the sections. When the plane is not in flight the weight of the sections rests on rollers 40 and 41. Obviously, the rails 19 and 20 may be provided with rollers to permit free movement of the sections thereover.

While the present is a disclosure of the preferred embodiment of the invention, it is to be understood that the invention is not limited thereto, as various changes in the minor details of construction, proportion and arrangement of parts may be resorted to without departing from the spirit of the invention as defined in the appended claims.

I claim:

1. In an airplane, a pair of spaced guide rods extending laterally therefrom, a wing comprising a plurality of detachable sections adapted to slide laterally along said rods and means for maintaining said wing sections in superimposed relation within said airplane.

2. In an airplane, a pair of spaced guide rods, a wing comprising a plurality of detachable sections adapted to slide along said rods, means for maintaining said wing sections in superimposed spaced relation within said airplane and means for elevating said sections.

3. In an airplane, a slidable wing and a pair of guide rods extending from said airplane and adapted to support said wing, said rods forming respectively the leading and trailing edges of said wing.

4. In an airplane, a wing comprising a plurality of detachable sections, a pair of rods extending from said airplane, means for supporting said sections in superimposed relation within said airplane, means for elevating said sections, means for connecting said sections and means for sliding the sections along said guide rods.

5. In an airplane, a wing comprising a plurality of detachable sections normally housed in superimposed spaced relation within the airplane, means for coupling said sections together, means for extending said sections from said airplane and guide rods for supporting said wing sections, said rods forming respectively the leading and trailing edges of the wing.

6. In an airplane, a wing comprising a plurality of detachable sections, each section presenting extensions extending from the front and rear face of said section, a pair of guide rods extending from said airplane, each having a longitudinal groove to slidably receive the extensions of said sections and means for sliding the sections along said guide rods.

In testimony whereof I affix my signature.

CHARLES W. CROOKE, Jr.